United States Patent
Watase

(10) Patent No.: US 10,352,822 B2
(45) Date of Patent: Jul. 16, 2019

(54) TEMPERATURE DISPLAY DEVICE OF VEHICLE

(71) Applicant: Mazda Motor Corporation, Aki-gun, Hiroshima (JP)

(72) Inventor: Hiroyuki Watase, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 137 days.

(21) Appl. No.: 15/398,093

(22) Filed: Jan. 4, 2017

(65) Prior Publication Data

US 2017/0234771 A1   Aug. 17, 2017

(30) Foreign Application Priority Data

Feb. 15, 2016 (JP) .................................. 2016-025739

(51) Int. Cl.
  *G01M 15/04* (2006.01)
  *G01K 13/02* (2006.01)
  *G01K 1/02* (2006.01)

(52) U.S. Cl.
  CPC ............ *G01M 15/048* (2013.01); *G01K 1/02* (2013.01); *G01K 13/02* (2013.01); *B60Y 2400/302* (2013.01); *B60Y 2400/92* (2013.01); *G01K 2013/026* (2013.01); *G01K 2205/00* (2013.01)

(58) Field of Classification Search
  CPC .......... F01P 11/16; G01K 13/02; G01K 1/02; G01K 2205/00; G04G 9/087; B60Y 2400/302; B60Y 2400/92; G01M 15/048

USPC ................................ 374/145, 208, 4, 5, 100
See application file for complete search history.

(56) References Cited

U.S. PATENT DOCUMENTS

| 5,121,714 A * | 6/1992 | Susa ....................... F01P 7/165 123/41.1 |
| 5,416,728 A * | 5/1995 | Rudzewicz .............. G01K 1/20 340/449 |
| 5,526,871 A * | 6/1996 | Musser .................... F01P 11/16 165/11.1 |
| 5,701,852 A * | 12/1997 | Suzuki .................... F01P 7/162 123/142.5 R |

(Continued)

FOREIGN PATENT DOCUMENTS

JP   H02242128 A   9/1990
JP   2006273114 A  10/2006

(Continued)

*Primary Examiner* — Gail Kaplan Verbitsky
(74) *Attorney, Agent, or Firm* — Alleman Hall Creasman & Tuttle LLP

(57) ABSTRACT

A temperature display device of a vehicle is provided, which includes a temperature sensor for detecting a temperature of coolant of an engine, the coolant being switched in circulation state by opening and closing a thermostat, between a first state where the coolant is circulated through a radiator and a second state where the coolant is circulated bypassing the radiator, a display unit for displaying a temperature of the coolant, and a controller for controlling a display mode of the display unit based on the detected temperature by the temperature sensor. When the detected temperature changes within a first temperature range where the thermostat is in an open state, the controller changes the displayed temperature on the display unit by less than the change of the detected temperature.

6 Claims, 4 Drawing Sheets

(56) References Cited

U.S. PATENT DOCUMENTS

| | | | | |
|---|---|---|---|---|
| 5,947,370 | A * | 9/1999 | Rona | F23N 1/022 236/20 A |
| 6,063,513 | A * | 5/2000 | Tanino | G02B 5/0891 359/883 |
| 6,108,614 | A * | 8/2000 | Lincoln | F24F 11/30 702/183 |
| 6,200,021 | B1 * | 3/2001 | Mitsutani | F01P 11/16 374/1 |
| 6,481,387 | B1 * | 11/2002 | Sano | B60H 1/00735 123/41.1 |
| 6,640,168 | B2 * | 10/2003 | Kastner | F01P 11/14 123/41.08 |
| 7,069,883 | B2 * | 7/2006 | Atkins | F01P 3/02 123/41.12 |
| 7,363,804 | B2 * | 4/2008 | Wakahara | F01P 11/14 374/E15.001 |
| 8,174,483 | B2 * | 5/2012 | Cheng | G06F 1/3203 345/102 |
| 9,022,647 | B2 * | 5/2015 | Jentz | F01P 11/16 374/145 |
| 10,060,326 | B2 * | 8/2018 | Kanzaka | F01P 3/02 |
| 2002/0157620 | A1 * | 10/2002 | Kastner | F01P 11/14 123/41.1 |
| 2002/0167227 | A1 * | 11/2002 | Matsunaga | B60H 1/00428 307/117 |
| 2003/0115012 | A1 * | 6/2003 | Manakkal | G01K 1/20 702/130 |
| 2008/0164980 | A1 * | 7/2008 | Ha | H04L 12/2827 340/286.02 |
| 2009/0207122 | A1 * | 8/2009 | Cheng | G06F 1/3203 345/102 |
| 2014/0071039 | A1 * | 3/2014 | Saiki | G09G 5/006 345/156 |
| 2014/0358293 | A1 * | 12/2014 | Fadell | G05D 23/1902 700/276 |
| 2014/0359267 | A1 * | 12/2014 | Moriki | G06F 9/441 713/2 |
| 2015/0066220 | A1 * | 3/2015 | Sloo | G05D 23/1902 700/276 |
| 2016/0293102 | A1 * | 10/2016 | Chaji | G09G 3/20 |
| 2016/0339767 | A1 * | 11/2016 | Enomoto | F25B 25/005 |
| 2018/0023453 | A1 * | 1/2018 | Okamura | F01P 7/165 123/142.5 E |
| 2018/0363538 | A1 * | 12/2018 | Kardos | F01P 7/167 |

FOREIGN PATENT DOCUMENTS

| | | |
|---|---|---|
| JP | 2007270661 A | 10/2007 |
| WO | WO2017123142 A * | 7/2017 |

* cited by examiner

TEMPERATURE DISPLAY DEVICE OF VEHICLE

BACKGROUND

The present invention relates to a temperature display device of a vehicle, which displays a temperature of coolant of an engine.

Generally, thermostats are provided in engine cooling systems where coolant is circulated between an engine and a radiator. This type of engine cooling system is formed with channels extending from the engine and returning to the engine, including a channel through the radiator and a channel bypassing the radiator. The channel to be used is switched by opening/closing the thermostat, thus the circulation state is switched between a first state in which the coolant of the engine is circulated through the radiator and a second state in which the coolant is circulated bypassing the radiator.

As the thermostat provided in the engine cooling system, the type which opens and closes by expansion and contraction of a thermal expansion material, such as wax, is broadly used. In this type of thermostat, when the temperature of the coolant therearound reaches a given opening temperature or above, the thermostat opens due to the expansion of the thermal expansion material, and when the coolant temperature falls below the opening temperature, the thermostat closes due to the contraction of the thermal expansion material. Further in the open state of the thermostat, the opening of thermostat becomes larger as the coolant temperature rises, and when the coolant temperature reaches a given full-opening temperature or above, the thermostat fully opens.

As disclosed in FIG. 1 of JP2006-273114A, a display of a water temperature meter (water temperature display) where a temperature of a coolant of an engine is displayed is usually provided on an instrument panel along with a display for a tachometer etc., and it is possible for a passenger to ascertain whether the engine is overheated and estimate the function level of a car heater based on the displayed contents in the water temperature display.

Incidentally, in a state where the thermostat is partially opened, the engine coolant is adjusted in temperature so that around the thermostat, the temperature is between an opening temperature and below a full-opening temperature. In this state, the temperature of the engine coolant is adjusted by significantly varying while repeating a frequent decrease and increase. Although there is no significant problem with such a variation of the coolant temperature itself, if the displayed contents on the water temperature display significantly vary corresponding to the coolant temperature, the passenger may feel disconcerted.

In this regard, with a water temperature meter of the conventional analog pointer type, while the detected temperature is within a given wide temperature range, even if this detected temperature varies within the temperature range, the pointer of the water temperature display is locked to point at a given temperature within the temperature range. Thus, it is prevented that the passenger feels disconcerted.

The water temperature display of the water temperature meter of the conventional analog pointer type usually has a simple design such that a plurality of temperature ranges are defined by a plurality scales, one of these temperature ranges higher than a regular-use range is colored in, for example, red, one of the ranges lower than the regular-use range is colored in, for example, blue, and the scales are not assigned with numerical values. Therefore, a specific temperature cannot be ascertained.

On the other hand, a type of water temperature meter which digitally displays on a liquid crystal display (LCD) etc., has been put in discussion or practice. For the water temperature display of this type, to respond to the needs of users toward more accurate water temperature, it is discussed in some cases to display numerical values corresponding to the scales in addition to digitally displaying scales and a pointer similar to the conventional analog pointer type.

However, in the case of providing the numerical values to the scales of the water temperature display, if the pointer is locked at a position corresponding to a given temperature similarly to the conventional type when an actual water temperature varies within the given temperature range, the pointer keeps pointing at the scale provided with the numerical value of the temperature different from the actual water temperature in this locked state, which goes against the needs of the users toward the actual water temperature. On the other hand, if the detected water temperature is displayed as it is at all times, the displayed temperature significantly varies as the actual water temperature varies within the temperature range where the actual water temperature significantly varies as described above, and the conventional problem in which the passenger may feel disconcerted even if the engine cooling system is functioning normally remains.

SUMMARY

The present invention is made in view of the above issues, and aims to display on a temperature display device of a vehicle a temperature of coolant of an engine more accurately than the conventional arts, while avoiding causing a disconcerted feeling to a passenger due to an excessive variation of the displayed temperature of the coolant.

According to one aspect of the present invention, a temperature display device of a vehicle is provided, which includes a temperature sensor for detecting a temperature of coolant of an engine, the coolant being switched in circulation state by opening and closing a thermostat, between a first state where the coolant is circulated through a radiator and a second state where the coolant is circulated bypassing the radiator, a display unit for displaying a temperature of the coolant, and a controller for controlling a display mode of the display unit based on the detected temperature by the temperature sensor. When the detected temperature changes within a first temperature range where the thermostat is in an open state, the controller changes the displayed temperature on the display unit by less than the change of the detected temperature.

According to the above configuration, within the first temperature range where the thermostat is in the open state, even when a significant variation of the temperature of the coolant is detected, the displayed temperature on the display unit changes by less than the change of the detected temperature. Therefore, it is avoided that a passenger feels disconcerted due to the variation of the detected temperature.

Further, since the displayed temperature changes less according to the change of the detected temperature when the temperature within the first temperature range is detected, a brief change of an actual water temperature is reflected on the displayed temperature. Therefore, it is possible to inform the passenger, on a certain level of accuracy, of an increase and decrease of the water temperature within the first temperature range, and display on the display unit a temperature closer to the actual water temperature, compared to a case where the displayed temperature is locked at a given temperature.

When the detected temperature changes within a second temperature range on the higher temperature side of the first temperature range, the controller may change the displayed temperature by more than the change of the detected temperature.

According to the above configuration, within the second temperature range on the higher temperature side of the first temperature range, the displayed temperature is increased by more than the increase of the detected temperature. Therefore, it becomes easier to allow the passenger to ascertain that the engine is close to overheating.

When the detected temperature changes within a third temperature range on the higher temperature side of the second temperature range, the controller may change the displayed temperature by less than the change of the detected temperature within the second temperature range.

According to the above configuration, in a state where the temperature within the third temperature range on the higher temperature side of the second temperature range is detected and the engine is overheated, the passenger feeling excessively disconcerted due to the sharp increase of the displayed temperature is avoided.

When the detected temperature changes within a fourth temperature range on the lower temperature side of the first temperature range, the controller may change the displayed temperature by more than the change of the detected temperature.

According to the above configuration, within the fourth temperature range on the lower temperature side of the first temperature range, the displayed temperature is increased by more than the increase of the detected temperature. Therefore, when it is harder to increase the coolant temperature (e.g., when traveling in a cold region) than when traveling in a normal temperature region, the passenger feeling that the performance of a car heater is degraded due to the low coolant temperature is avoided.

Further, the display unit may be provided with a plurality of scales and a pointer, be colored to indicate a low temperature within a low temperature range, and be colored to indicate a high temperature within a high temperature range. When the detected temperature changes within a second temperature range on the higher temperature side of the first temperature range, the controller may change the displayed temperature by more than the change of the detected temperature. When the detected temperature changes within a third temperature range that is on the higher temperature side of the second temperature range and is a high temperature range of the display unit, the controller may change the displayed temperature by less than the change of the detected temperature within the second temperature range.

The display unit may be provided with a plurality of scales and a pointer, be colored to indicate a low temperature within a low temperature range, and be colored to indicate a high temperature within a high temperature range. When the detected temperature changes within a fourth temperature range that is on the lower temperature side of the first temperature range and is close to the higher temperature side of the low temperature range of the display unit, the controller may change the displayed temperature by more than the change of the detected temperature.

DETAILED DESCRIPTION OF EMBODIMENT

Hereinafter, one embodiment of the present invention is described with reference to the appended drawings.

Figure 1:
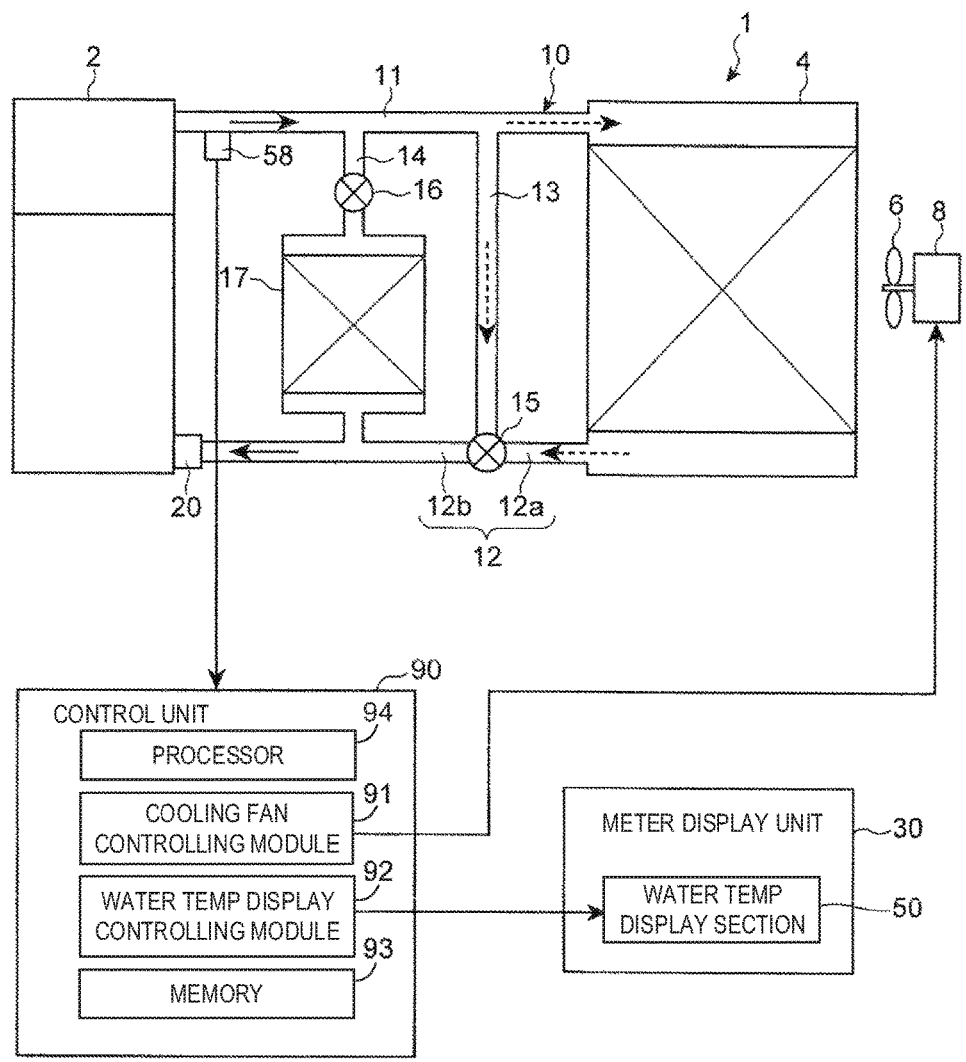
FIG. 1 is a view illustrating a cooling system of an engine and a part of a control system relating to the cooling system.

As illustrated in FIG. 1, an engine cooling system 1 includes a channel 10 of coolant of an engine 2, a radiator 4 for cooling the coolant flowing through the channel 10, and a water pump 20 provided in the channel 10.

The coolant flowing through the channel 10 is cooled by vehicle travelling wind when passing through the radiator 4, or is forcibly cooled by a cooling fan 6 rotationally driven by a motor 8 as needed.

The water pump 20 is communicated with a crankshaft of the engine 2 via a timing belt. Therefore, the water pump 20 is driven by driving the engine 2, and by driving the water pump 20, the coolant is circulated in the channel 10.

The channel 10 includes a first passage 11 for guiding the coolant from the engine 2 side to the radiator 4 side, a second passage 12 for guiding the coolant from the radiator 4 side to the engine 2 side, and a bypass passage 13 for guiding the coolant from the first passage 11 to the second passage 12 by bypassing the radiator 4.

The channel 10 is provided with a thermostat 15, and the thermostat 15 is opened and closed to switch a circulation state of the coolant of the engine 2 between a first state where the coolant is circulated through the radiator 4 and a second state where the coolant is circulated bypassing the radiator 4.

The thermostat 15 is a three-way valve provided in a merge section of the bypass passage 13 and the second passage 12. The thermostat 15 is switched in operation state between an open state where an upstream passage part 12a of the second passage 12 upstream of the thermostat 15 is communicated with a downstream passage part 12b of the second passage 12 downstream of the thermostat 15, and a closed state where the downstream passage part 12b is shut against the upstream passage part 12a.

In the open state of the thermostat 15, the first state where the coolant is circulated through the radiator 4 is applied. Further in the open state of the thermostat 15, the opening of the thermostat 15 becomes larger as the temperature of the coolant around the thermostat 15 increases. In the closed state of the thermostat 15, the bypass passage 13 is communicated with the downstream passage part 12b, thus the second state where the coolant is circulated bypassing the radiator 4 is applied.

Further the channel 10 includes a heater passage 14 for guiding the coolant from the first passage 11 to the second passage 12 by bypassing the radiator 4 and the bypass passage 13. The heater passage 14 is provided with a heater valve 16 for opening and closing the heater passage 14 and a heater core 17 of a car heater. When the heater is turned on, the heater valve 16 is opened, thus the coolant heated by the engine 2 flows through the heater passage 14 and exchanges in heat with air inside a cabin by the heater core 17.

The temperature display device of a vehicle of this embodiment includes a temperature sensor 58 for detecting a temperature of the coolant of the engine 2, a water temperature display section (display unit) 50 where the temperature of the coolant of the engine 2 is displayed, and a control unit (controller) 90 for controlling a display mode of the water temperature display section 50 based on the detected temperature by the temperature sensor 58.

The temperature sensor 58 is provided at a given position in the channel 10, for example, in an upstream end part of the first passage 11. Note that the position of the temperature sensor 58 in the channel 10 is arbitrary, and the temperature sensor 58 may be provided in a part of the channel 10 other than the first passage 11, or a plurality of temperature sensors may be provided in the channel 10.

The control unit 90 comprises a processor 94 configured to execute various software modules stored in nonvolatile memory or firmware, including a cooling fan controlling module 91 for controlling the cooling fan 6 and a water temperature display controlling module 92 for controlling a display mode of the water temperature display section 50, and may further comprise a memory 93 for storing various information which may include the above modules. Note that the memory 93 may be configured as an external device connected to the control unit 90.

The control unit 90 receives signals from the temperature sensor 58, etc. In the control unit 90, the cooling fan controlling module 91 outputs a signal to the motor 8, and the water temperature display controlling module 92 outputs a signal to the water temperature display section 50.

The cooling fan controlling module 91 operates the motor 8 when, for example, the coolant temperature is above a given temperature or a vehicle speed is below a given speed based on the input signals from the temperature sensor 58, a vehicle speed sensor (not illustrated), etc. Thus, the forced cooling by the cooling fan 6 is performed.

The water temperature display controlling module 92 controls a display mode for temperature on the water temperature display section 50 based on the input signal from the temperature sensor 58 and the information stored in the memory 93.

Figure 2:
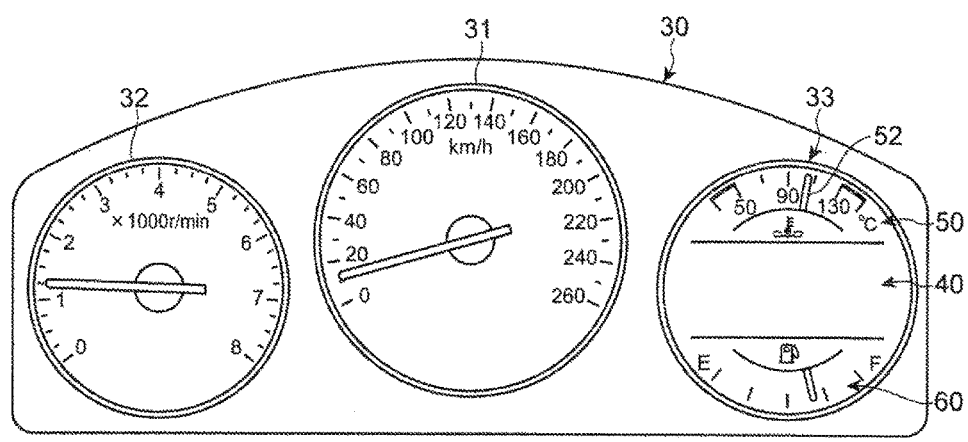
FIG. 2 is a view illustrating a meter display unit.

As illustrated in FIG. 2, the water temperature display section 50 is formed on a meter display unit 30 attached to an instrument panel, for example.

The meter display unit 30 is configured by, for example, an LCD, and includes a first meter display 31, a second meter display 32, and a third meter display 33. Each of the meter displays 31 to 33 is formed in a circle, for example.

The first meter display 31 is provided in a center part of the meter display unit 30 in vehicle left-and-right directions and is configured by, for example, a vehicle speed display where the vehicle speed is displayed. The second meter display 32 is provided on the left side of the first meter display 31 on the meter display unit 30 and is configured by, for example, a tachometer display where a speed of the engine 2 is displayed.

The third meter display 33 is divided into three sections in vehicle up-and-down directions, for example. A maintenance information display section 40 where information regarding maintenance of the vehicle is displayed as needed is provided in a center section of the third meter display 33 in the vehicle up-and-down directions, the water temperature display section 50 is provided on the third meter display 33 above the maintenance information display section 40, and a fuel remaining amount display section 60 where a remaining amount of fuel in the fuel tank is displayed is provided on the third meter display 33 below the maintenance information display section 40.

The water temperature display section 50 displays a plurality of scales and a pointer 52. Among the scales displayed in the water temperature display section 50, the scales indicating, for example, 50, 90, and 130° C. are displayed along with these numerical values. In the water temperature display section 50, a range between a lowest-temperature scale and the scale of 50° C. (low-temperature range) is colored in, for example, blue, a range between a highest-temperature scale and the scale of 130° C. (high-temperature range) is colored in, for example, red, and a regular-use range from 50° C. to below 130° C. is not colored. The displayed pointer 52 moves according to the detected temperature by the temperature sensor 58 and points the position corresponding to the detected temperature.

The water temperature display section 50 displays, instead of an actual water temperature detected by the temperature sensor 58 (detected temperature) Ta as it is, a displayed temperature Tb obtained based on the information stored in the memory 93 and the actual water temperature Ta. The memory 93 stores information defining the relationship between the displayed temperature Tb and the actual water temperature Ta, and this information is used for the display control of the water temperature display section 50.

Figure 3:
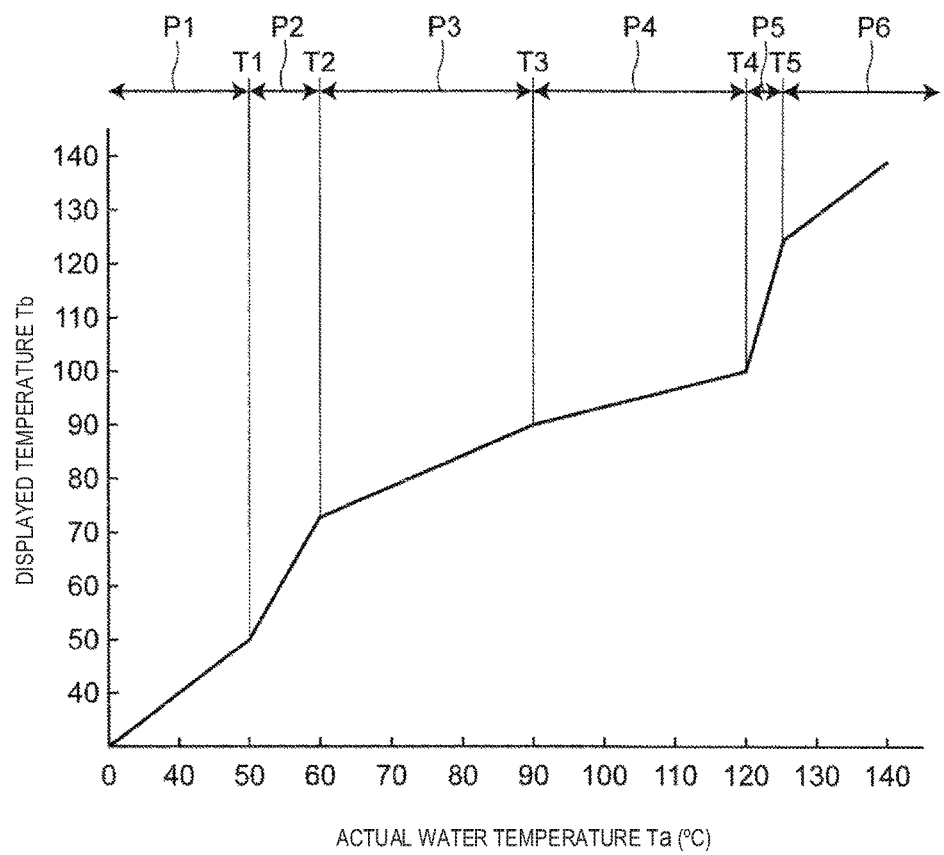
FIG. 3 is a chart illustrating an example of a relationship between an actual water temperature and a displayed temperature.

FIG. 3 illustrates one example of the relationship between the displayed temperature Tb and the actual water temperature Ta. In the example of FIG. 3, the temperature range of the actual water temperature Ta is sectioned into six segments P1, P2, P3, P4, P5 and P6, and the relationship between the actual water temperature Ta and the displayed temperature Tb is set for each of the temperature segments P1 to P6.

Boundaries of the temperature segments P1 to P6 of the actual water temperature Ta are, from the lower temperature side, a first temperature T1, a second temperature T2, a third temperature T3, a fourth temperature T4, and a fifth temperature T5. The first segment P1 is below the first temperature T1, the second segment P2 is from the first temperature T1 to below the second temperature T2, the third segment P3 is from the second temperature T2 to below the third temperature T3, the fourth segment P4 is from the third temperature T3 to below the fourth temperature T4, the fifth segment P5 is from the fourth temperature T4 to below the fifth temperature T5, and the sixth segment P6 is the fifth temperature T5 and above.

The first temperature T1 is, for example 50° C., and the first segment P1 is the low-temperature range below 50° C. Within the first segment P1, the actual water temperature Ta and the displayed temperature Tb are in an equivalent relationship, and when the actual water temperature Ta decreases or increases, the displayed temperature Tb changes similarly thereto. The first segment P1 is a segment within which the actual water temperature Ta stably increases or decreases and a repeated up-and-down variation of the actual water temperature Ta does not easily occur. Therefore, even if the displayed temperature Tb changes similarly to the actual water temperature Ta within the first segment P1, a passenger does not feel disconcerted thereby.

The second temperature T2 is, for example 60° C. The second segment P2 is a lowest segment of the regular-use range, from 50° C. to below 60° C., and it may be referred to as "the fourth temperature range." Within the second segment P2, the displayed temperature Tb is set to a value in proportion to the actual water temperature Ta, and the proportional constant is higher than 1.

Thus, when the actual water temperature Ta changes within the second segment P2, the displayed temperature Tb changes by more than the change of the actual water temperature Ta. Therefore, for example, when the engine 2 is started in a cold region and the actual water temperature Ta changes by less than when it changes in a warm region, by increasing the displayed temperature Tb by more than the increase of the actual water temperature Ta, the displayed temperature Tb is increased in the same or similar mode as that of the warm region. As a result, the passenger can reliably be informed of the smooth increase of the actual water temperature Ta on the level that the car heater is able to function suitably, and thus it is avoided that the passenger is misinformed of degradation in the performance of the car heater.

The third temperature T3 is, for example, 90° C. The third segment P3 is a second lowest segment of the regular-use range adjacent to the second segment P2, from 60° C. to below 90° C. Within the third segment P3, the displayed temperature Tb is set to a value in proportion to the actual water temperature Ta, and the proportional constant is lower than 1. Thus, when the actual water temperature Ta changes within the third segment P3, the displayed temperature Tb changes by less than the change of the actual water temperature Ta.

The fourth temperature T4 is, for example, 120° C. The fourth segment P4 is a segment of the regular-use range adjacent to the third segment P3, from 90° C. to below 120° C., and it may be referred to as "the first temperature range." Within the fourth segment P4, the displayed temperature Tb is set so that it is 90° C. when the actual water temperature Ta is 90° C., and is a value in proportion to the actual water temperature Ta when the actual water temperature Ta is above 90° C., and the proportional constant is lower than 1 and further lower than the proportional constant within the third segment P3. Thus, when the actual water temperature Ta changes within the fourth segment P4, the displayed temperature Tb changes by less than the change of the actual water temperature Ta. The change of the displayed temperature Tb within the fourth segment P4 is more gradual than within the other segments P1, P2, P3, P5, and P6.

The fourth segment P4 is a temperature segment where the thermostat 15 is in the open state. Therefore within the fourth segment P4, since the coolant temperature is adjusted by the thermostat 15, a frequent up-and-down variation of the actual water temperature Ta easily occurs. Within this fourth segment P4 where the actual water temperature Ta easily varies, since the displayed temperature Tb changes by less than the actual water temperature Ta, the variation of the displayed temperature Tb is suppressed, and as a result, it is avoided that the passenger feels disconcerted due to an excessive variation of the displayed temperature Tb.

Further within the fourth segment P4, even though the actual water temperature Ta significantly varies, the displayed temperature Tb changes less according to the change of the actual water temperature Ta without being locked. Therefore, a brief change of the actual water temperature Ta is reflected on the displayed temperature Tb. Thus it is possible to ascertain to a certain level of accuracy the substantial increase and decrease of the actual water temperature Ta by the displayed contents on the water temperature display section 50, and display on the water temperature display section 50 a temperature closer to the actual water temperature Ta compared to the conventional case.

Moreover, the pointer 52 (see FIG. 2) in the water temperature display section 50 points at the temperature closer to the actual water temperature Ta at all times without being locked, thus, by referring to the displayed pointer 52 and the numerical value of the temperature applied, the passenger is able to ascertain the actual water temperature Ta and the change thereof more accurately compared to the conventional case.

The fifth temperature T5 is, for example, 125° C. The fifth segment P5 is a segment of the regular-use range on the higher temperature side of the fourth segment P4, from 120° C. to below 125° C., and it may be referred to as "the second temperature range." The sixth segment P6 is a segment of 125° C. and above, that covers a highest temperature segment of the regular-use range and exceeds the regular-use range, and it may be referred to as "the third temperature range."

Within the fifth segment P5, the displayed temperature Tb is set to a value in proportion to the actual water temperature Ta, and the proportional constant is higher than 1. Thus, when the actual water temperature Ta changes within the fifth segment P5, the displayed temperature Tb changes by more than the change of the actual water temperature Ta (i.e., the line is steeper). The proportional constant of the fifth segment P5 is higher than the other segments P1, P2, P3, P4 and P6.

The fifth segment P5 is a temperature segment corresponding to a state immediately before the engine 2 is overheated. When the actual water temperature Ta increases within the fifth segment P5, by increasing the displayed temperature Tb by more than the increase of the actual water temperature Ta, it becomes easier to allow the passenger to ascertain that the engine 2 is close to overheating.

Further within the fifth segment P5, the thermostat 15 becomes fully open. In the fully opened state of the thermostat 15, since the actual water temperature Ta does not vary easily compared to a state where the thermostat 15 is partially opened, even if the displayed temperature Tb is set to easily change within the fifth segment P5, it is avoided that the passenger feels disconcerted due to the variation of the displayed temperature Tb within the fifth segment P5.

Within the sixth segment P6, the displayed temperature Tb is set to a value in proportion to the actual water temperature Ta, and the proportional constant is lower than that of the fifth segment P5. To be more exact, the proportional constant within the sixth segment P6 is set to 1. In other words, within the sixth segment P6, the displayed temperature Tb is set to be the same as the actual water temperature Ta. Thus, when the actual water temperature Ta changes within the sixth segment P6, the displayed temperature Tb changes by less than when the actual water temperature Ta changes within the fifth segment P5.

The sixth segment P6 corresponds to a state where the engine 2 is overheated. In the overheated state of the engine 2 when the actual water temperature Ta is increased within the sixth segment P6, by suppressing the sharp increase of the displayed temperature Tb, it is avoided that the passenger feels disconcerted.

According to the embodiment as described above, within any of the temperature segments P1 to P6, the displayed temperature Tb is changed according to the change of the actual water temperature (detected temperature) Ta without being locked. Further within the temperature segments P2 to P5, the display mode of the water temperature display section 50 is controlled so that the displayed temperature Tb is changed by less or more than the change of the actual water temperature (detected temperature) Ta. Therefore, it is avoided that the passenger feels disconcerted or is caused discomfort due to the change of the displayed temperature Tb, while achieving the more accurate display of temperature than the conventional case.

Figure 4:
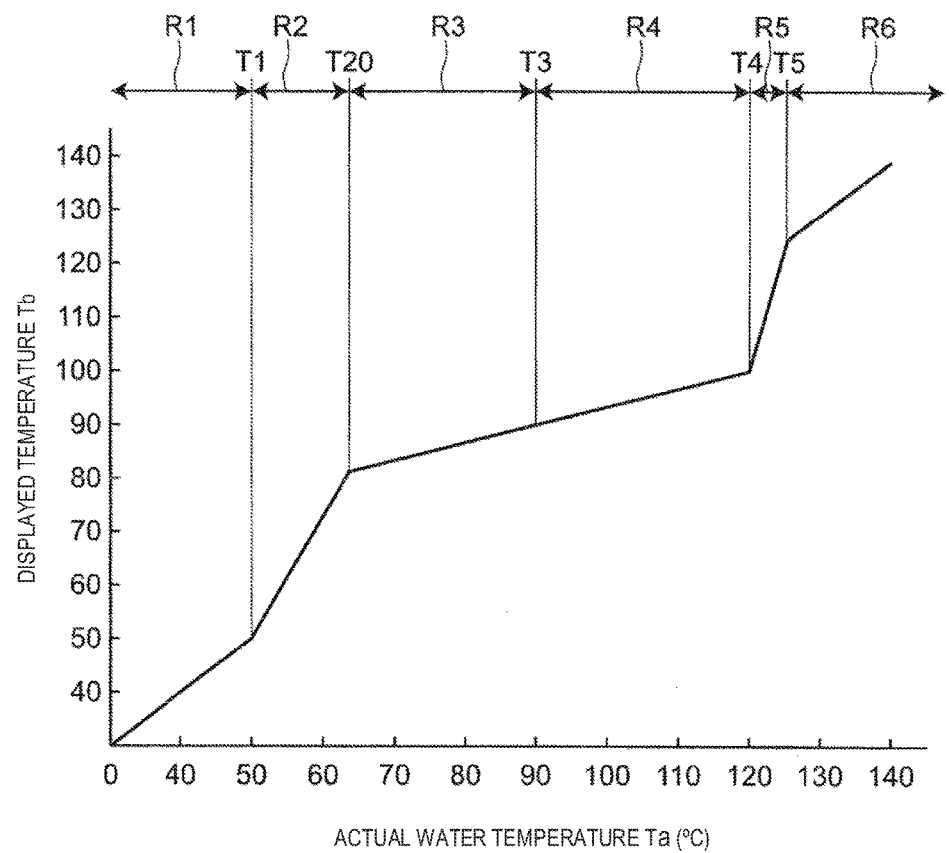
FIG. 4 is a chart illustrating another example of the relationship between the actual water temperature and the displayed temperature.

Note that, the relationship between the displayed temperature Tb and the actual water temperature Ta, which is used for the display control of the water temperature display section 50, may be different from the relationship of FIG. 3, and for example, a relationship illustrated in FIG. 4 may be used.

Also in the example of FIG. 4, the temperature range of the actual water temperature Ta is sectioned into six segments R1, R2, R3, R4, R5, and R6, and the relationship between the actual water temperature Ta and the displayed temperature Tb is set for each of the temperature segments R1 to R6.

In the example of FIG. 4, among first to fifth temperatures T1, T20, T3, T4 and T5 which are boundaries of the temperature segments R1 to R6, the first and third to fifth temperatures T1 and T3 to T5 are set similar to the example of FIG. 3, and the second temperature T20 is set higher than the second temperature T2 in the example of FIG. 3.

The first segment R1 below the first temperature T1, the fourth segment R4 from the third temperature T3 to below the fourth temperature T4, the fifth segment R5 from the fourth temperature T4 to below the fifth temperature T5, and the sixth segment R6 from the fifth temperature T5 and above are the same as the first and fourth to sixth segments P1 and P4 to P6 of FIG. 3, respectively, and within the segments R1 and R4 to R6, the relationship between the actual water temperature Ta and the displayed temperature Tb is set similar to the example of FIG. 3.

The second segment R2 from the first temperature T1 to below the second temperature T20 corresponds to the second segment P2 of FIG. 3 expanded to the higher temperature side, and within the second segment R2, the relationship between the actual water temperature Ta and the displayed temperature Tb is set similar to that of the second segment P2 of FIG. 3.

The third segment R3 from the second temperature T20 to below the third temperature T3 corresponds to the third segment P3 of FIG. 3 narrowed on the lower temperature side. The relationship between the actual water temperature Ta and the displayed temperature Tb within the third segment R3 is different from that within the third segment P3 of FIG. 3. In the example of FIG. 4, within the third and fourth segments R3 and R4, the same setting is applied regarding the relationship between the actual water temperature Ta and the displayed temperature Tb. In other words, the third and fourth segments R3 and R4 are one substantially continuous range.

Also in the example of FIG. 4, except for the more gradual change of the displayed temperature Tb within the third segment R3 (i.e., the shallower slope of the line), the change of the displayed temperature Tb according to the change of the actual water temperature Ta is the same as the example of FIG. 3. Therefore, it is possible to obtain the same effects to the above description.

Although the embodiment is described above as an example of the present invention, the present invention is not limited to this embodiment.

For example, in this embodiment, the example in which the displayed temperature Tb is changed in proportion to the change of the actual water temperature Ta within each temperature segment is described; however, a specific manner of changing the displayed temperature Tb according to the actual water temperature Ta is arbitrary, for example, the displayed temperature Tb may be changed based on an exponential function or in a stepwise fashion, according to the actual water temperature Ta.

Further in this embodiment, the example of displaying the pointer on the display unit (water temperature display section 50) is described; however, in the present invention, the specific display mode (form) of the display unit is not particularly limited, for example, the display unit may display the numerical value of the water temperature alone.

Moreover in this embodiment, the example in which the display unit is a liquid crystal display is described; however, in the present invention, the configuration of the display unit is not particularly limited, for example, the present invention may be applied to a conventional analog pointer type.

As described above, according to the present invention, it becomes possible to display on a temperature display device of a vehicle a temperature of a coolant of an engine more accurately than the conventional arts, while avoiding causing a disconcerted feeling to a passenger due to an excessive variation of the displayed temperature of the coolant. Therefore, the present invention is suitably usable in the industrial fields of manufacturing this type of temperature display devices.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Cooling System
2 Engine
4 Radiator
6 Cooling Fan
8 Motor
10 Channel
11 First Passage
12 Second Passage
13 Bypass Passage
14 Heater Passage
15 Thermostat
17 Heater Core
20 Water Pump
30 Meter Display Unit
31 First Meter Display
32 Second Meter Display
33 Third Meter Display
40 Maintenance Information Display Section
50 Water Temperature Display Section (Display Unit)
58 Temperature Sensor
60 Fuel Remaining Amount Display Section
90 Control Unit (Controller)
91 Cooling Fan Controlling Module
92 Water Temperature Display Controlling Module
93 Memory
P1 First Segment
P2 Second Segment (Fourth Temperature Range)
P3 Third Segment
P4 Fourth Segment (First Temperature Range)
P5 Fifth Segment (Second Temperature Range)
P6 Sixth Segment (Third Temperature Range)
R1 First Segment
R2 Second Segment (Fourth Temperature Range)
R3 Third Segment
R4 Fourth Segment (First Temperature Range)
R5 Fifth Segment (Second Temperature Range)
R6 Sixth Segment (Third Temperature Range)
T1 First Temperature
T2 Second Temperature
T3 Third Temperature
T4 Fourth Temperature T5 Fifth Temperature
T20 Second Temperature

What is claimed is:

1. A temperature display device of a vehicle, comprising:
a temperature sensor for detecting a detected temperature of coolant of an engine and a detected change of the detected temperature, the coolant being switched in circulation state by opening and closing a thermostat, between a first state where the coolant is circulated through a radiator and a second state where the coolant is circulated bypassing the radiator;
a display unit for displaying a displayed temperature of the coolant; and
a controller comprising a processor for:
receiving signals from the temperature sensor indicating the detected temperature,
obtaining the displayed temperature by applying a first display relationship to the detected temperature when the detected temperature is within a first temperature range where the thermostat is in an open state, wherein the first display relationship defines the displayed temperature to be a proportion of the detected temperature, such that over time as the temperature sensor detects changes in the detected temperature, the controller obtains the displayed temperature such that the displayed temperature changes less than the detected temperature, and
controlling a display mode of the display unit to display the displayed temperature of the coolant on the display unit based on the detected temperature of the coolant.

2. The temperature display device of claim 1, wherein when the detected temperature changes within a second temperature range higher in temperature than the first temperature range, the controller configures a second display relationship defining the displayed temperature to be a proportion of the detected temperature within the second temperature range, such that over time as the temperature sensor detects changes in the detected temperature, the controller obtains the displayed temperature such that the displayed temperature changes more than the detected temperature, and causes the display unit to display the displayed temperature according to the second display relationship.

3. The temperature display device of claim 2, wherein when the detected temperature changes within a third temperature range higher in temperature than the second temperature range, the controller configures a third display relationship defining the displayed temperature to be a proportion of the detected temperature within the third temperature range, such that over time as the temperature sensor detects changes in the detected temperature, the controller obtains the displayed temperature such that the displayed temperature changes less than the detected temperature, and causes the display unit to display the displayed temperature according to the third display relationship.

4. The temperature display device of claim 1, wherein when the detected temperature changes within a fourth temperature range lower in temperature than the first temperature range, the controller configures a fourth display relationship defining the displayed temperature to be a proportion of the detected temperature within the fourth temperature range, such that over time as the temperature sensor detects changes in the detected temperature, the controller obtains the displayed temperature such that the displayed temperature changes more than the detected temperature, and causes the display unit to display the displayed temperature according to the fourth display relationship.

5. The temperature display device of claim 1, wherein the display unit is provided with a plurality of scales and a pointer, is colored to indicate a low temperature within a low temperature range, and is colored to indicate a high temperature within a high temperature range,
wherein when the detected temperature changes within a second temperature range higher in temperature than the first temperature range, the controller configures a second display relationship defining the displayed temperature to be a proportion of the detected temperature within the second temperature range, such that over time as the temperature sensor detects changes in the detected temperature, the controller obtains the displayed temperature such that the displayed temperature changes more than the detected temperature, and causes the display unit to display the displayed temperature according to the second display relationship, and
wherein when the detected temperature changes within a third temperature range that is higher in temperature than the second temperature range and is the high temperature range of the display unit, the controller configures a third display relationship defining the displayed temperature to be a proportion of the detected temperature within the third temperature range, such that over time as the temperature sensor detects changes in the detected temperature, the controller obtains the displayed temperature such that the displayed temperature changes less than the detected temperature, and causes the display unit to display the displayed temperature according to the third display relationship.

6. The temperature display device of claim 1, wherein the display unit is provided with a plurality of scales and a pointer, is colored to indicate a low temperature within a low temperature range, and is colored to indicate a high temperature within a high temperature range, and
wherein when the detected temperature changes within a fourth temperature range that is lower in temperature than the first temperature range and is close to a higher temperature side of the low temperature range of the display unit, the controller configures a fourth display relationship defining the displayed temperature to be a proportion of the detected temperature within the fourth temperature range, such that over time as the temperature sensor detects changes in the detected temperature, the controller obtains the displayed temperature such that the displayed temperature changes more than the detected temperature, and causes the display unit to display the displayed temperature according to the fourth display relationship.

* * * * *